United States Patent

Schexnayder

[11] 3,966,066
[45] June 29, 1976

[54] HYDRAULIC CIRCUIT
[75] Inventor: Lawrence F. Schexnayder, Joliet, Ill.
[73] Assignee: Caterpillar Tractor Co., Peoria, Ill.
[22] Filed: Apr. 25, 1975
[21] Appl. No.: 571,873

[52] U.S. Cl. ............................ 214/146 R; 91/412
[51] Int. Cl.² ........................................ E02F 3/40
[58] Field of Search ............... 214/138 R, 762, 763, 214/764, 146 R; 91/411 R, 412, 461

[56] References Cited
UNITED STATES PATENTS

| | | | |
|---|---|---|---|
| 3,578,188 | 5/1971 | Drieschner | 214/146 R |
| 3,650,425 | 3/1972 | Hallman et al. | 214/762 |
| 3,653,523 | 4/1972 | Long et al. | 214/762 |
| 3,869,054 | 3/1975 | Moreau | 214/146 R |

Primary Examiner—Albert J. Makay
Assistant Examiner—Ross Weaver
Attorney, Agent, or Firm—Ralph E. Walters

[57] ABSTRACT

A hydraulic circuit is disclosed in which a control valve is connected in parallel between a first and second moving circuits. The first and second moving circuits include interrupted series-type valves responsive to pilot input signals. The control valve is responsive to the input signal to the first series valve wherein a portion of the flow from the first circuit is diverted to the second circuit, thereby permitting the operation of both circuit end functions at maximum speed.

7 Claims, 2 Drawing Figures

HYDRAULIC CIRCUIT

BACKGROUND OF THE INVENTION

This invention relates generally to hydraulic circuits, and more particularly to a hydraulic circuit for a bottom dump front shovel which offers more rapid apron closing and repositioning of the bucket to the digging position.

Hydraulic circuits incorporating interrupted series control valves have long been used in various fields, and particularly in construction equipment such as excavators and front loaders and the like. One disadvantage of any circuit utilizing interrupted series control valves is that only one valve in the bank of valves can be operated at one time. Thus, if the first valve is actuated, that valve controls the flow of the hydraulic fluid. As an example, in an excavator, the first circuit may control the bucket movement and the second circuit would control the apron movement. Then in the present circuitry, there could not be simultaneous apron and bucket movement without auxiliary pumps, valves, conduits, etc.

In an excavator, for example, it is desirable for the operator to return the bucket to its digging position as quickly as possible in order to cut down on the cycle time. In the above-described circuitry, simultaneous return of the bucket and closing of the apron was not possible under full speed conditions due to the interrupted series control valves. It is, of course, possible to operate both circuit control valves simultaneously in the fine modulating mode. However, this is not satisfactory from the speed standpoint.

Accordingly, it is an object of this invention to provide a hydraulic circuit which offers more rapid apron closing and repositioning of the bucket to the digging position.

Another object of this invention is to provide a hydraulic circuit which will permit diverting a portion of the flow from the first circuit to perform the end function of the second circuit, thereby offering simultaneous operation of both circuits under maximum speed operational conditions.

A further object of this invention is to provide a hydraulic circuit which will permit an operator to return the bucket and close the apron simultaneously in order to reduce the cycle time from dump to dig.

And yet another object of this invention is to provide a hydraulic circuit which will permit independent operation of either circuit through the interrupted series control valves.

SUMMARY

A hydraulic circuit is shown having particular utility for bottom dump front shovel machines. The hydraulic circuit incorporates interrupted series control valves controlling hydraulic flow to a first and second hydraulic circuit. The first circuit operatively controls the movement of the bucket and the second circuit operatively controls the movement of the apron. A control valve is connected in parallel between the first and second circuits wherein actuation of the control valve diverts a portion of the flow from the first circuit to the second circuit.

Other objects, details, uses, and advantages of this invention will become apparent as the following description of the exemplary embodiment thereof presented in the accompanying drawings proceeds.

BRIEF DESCRIPTION OF THE DRAWINGS

The accompanying drawings show a present exemplary embodiment of this invention in which.

DESCRIPTION OF ILLUSTRATED EMBODIMENT

Figure 1:
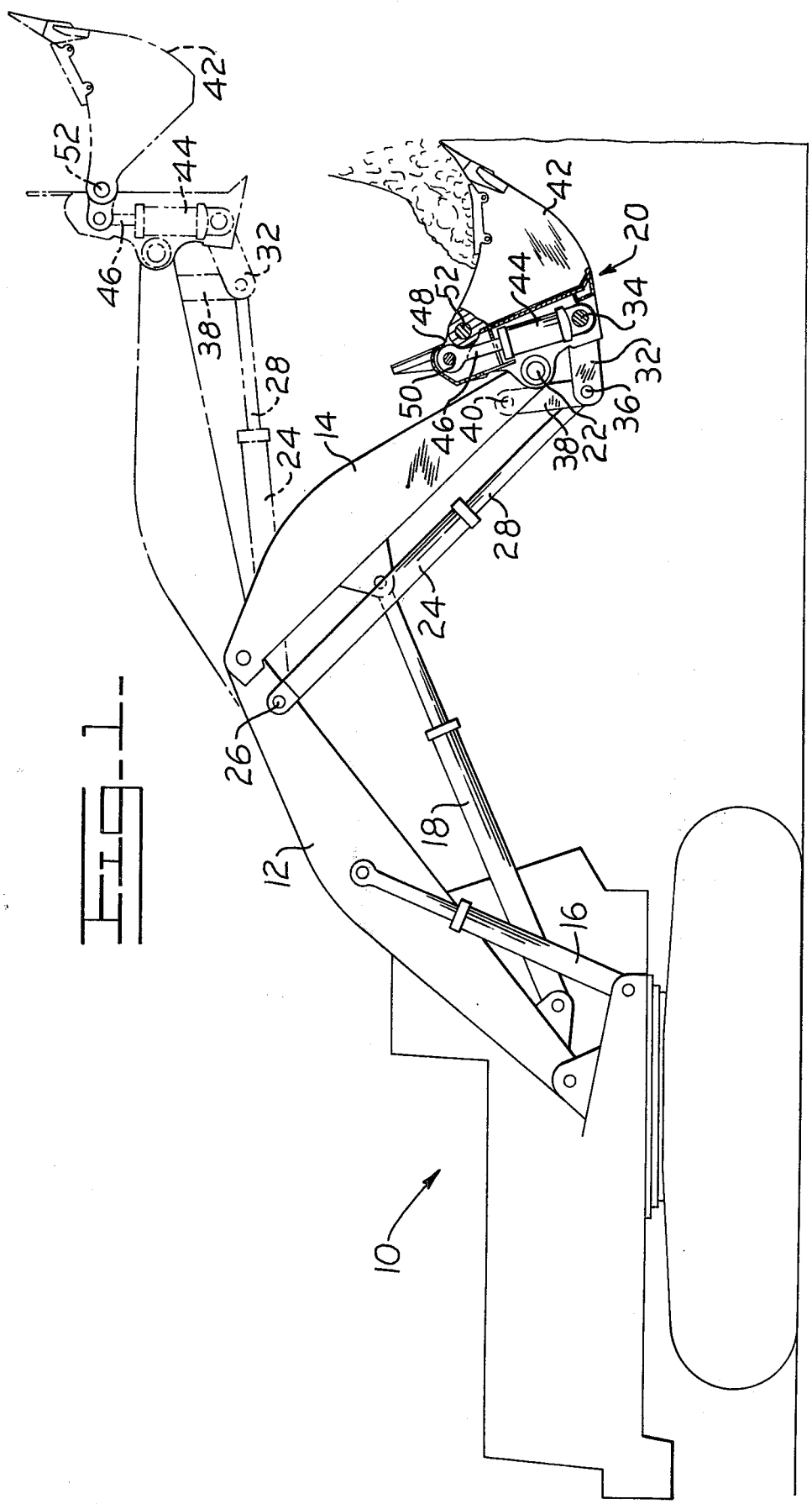
FIG. 1 is a side elevational view of a machine equipped with the circuitry of this invention.

Reference is now made to FIG. 1 of the drawings, which illustrates one exemplary machine, commonly called an excavator, incorporating the hydraulic circuitry of this invention and which is generally designated by the reference numeral 10. The excavator 10 incorporates a pivotally mounted boom 12 to which a stick 14 is pivotally mounted at its outer end. Hydraulic cylinders 16 and 18 are pivotally connected respectively to the boom 12 and stick 14 and provide the motive power for moving the boom and stick. The circuitry and operation of the cylinders and boom and stick are conventional and well known, and a further detailed description is believed unnecessary.

A bucket 20 is rotatably mounted to the outer end of stick 14 by a pivot shaft or the like 22. Rotation of the bucket 20 about the pivot 22 is controlled by a hydraulic ram such as bucket cylinder 24. In the illustrative embodiment shown, the head end of the cylinder 24 is pivotally connected to the boom 12 by pivot shaft 26. The rod 28 of cylinder 24 is pivotally connected to the bucket 20 through wrist linkage 30. Link 32 of the linkage 30 is pivotally connected at one end to shaft 34 of the bucket and is pivotally connected at its other end by pivot pin 36 to the rod 28. Link 38 of linkage 30 is pivotally connected to the stick 14 by pivot shaft 40 and at the other end is pivotally connected with shaft 36.

The opening and closing of the apron 42 of the bucket 20 is controlled by the apron cylinder 44. The head end of the apron cylinder 44 is pivotally mounted on shaft 34. The rod 46 is pivotally connected by shaft 50 to the bucket link extension 48. Thus, as seen in phantom in FIG. 1, the apron 42 will pivot about the pivot shaft 52 in response to the extension and retraction of rod 46 of the cylinder 44.

Figure 2:
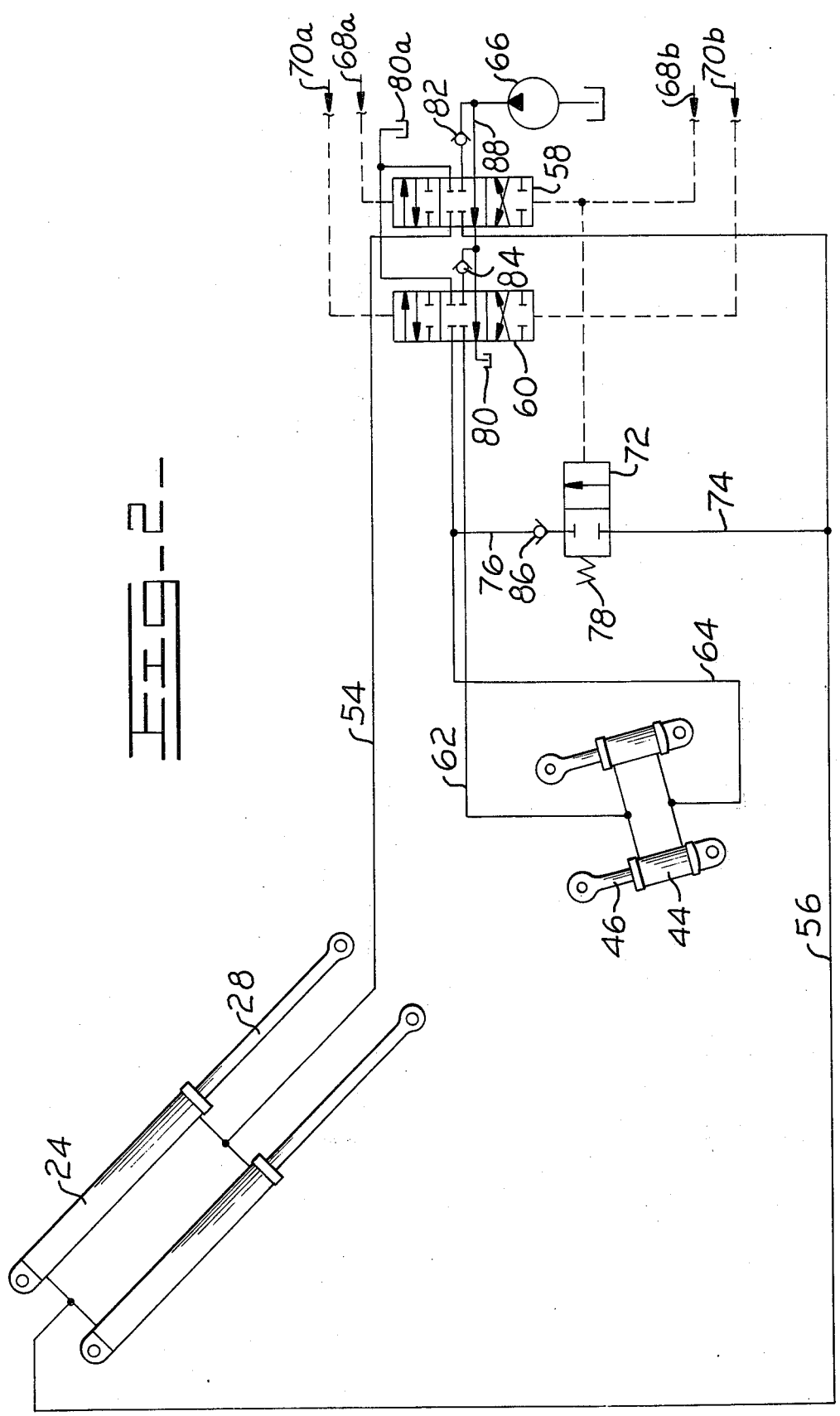
FIG. 2 is a schematic view showing the hydraulic circuit of this invention.

Referring now to FIG. 2, the hydraulic circuitry used in the control of the bucket 20 and apron 42 is schematically shown. The bucket cylinder 24 is connected via conduits 54 and 56 with a bucket cylinder control valve 58. An apron cylinder control valve 60 is connected by conduits 62 and 64 with the apron cylinder 44. It should be noted that in the illustrative embodiment herein described, the bucket cylinder 24 and apron cylinder 44 are descriptively shown as each being a pair of cylinders. It is obvious that each of the double cylinders may be replaced with a single cylinder of a larger capacity. It is also obvious that each of the double cylinders work in unison since each of the respective conduits communicate directly with each cylinder of each pair.

The selector valves 58 and 60 are of the interrupted series type. Thus, when one of the valves is actuated, that valve controls the primary flow from the pump 66. If both valves are actuated simultaneously, the first valve, i.e., valve 58, will control the path of the primary flow from pump 66. The valves 58 and 60 are three-position valves responsive to input signals 68a–68b, and 70a–70b, respectively.

A two-position control valve 72 is connected in parallel between the head end of cylinder 24 and the head end of cylinder 44. Conduit 74 provides communication between the valve 72 and conduit 56, and conduit 76 provides communication between the valve 72 and conduit 64. Bias means 78, such as a spring or the like, urge the valve 72 to a nonconducting position which interrupts communication between conduits 56 and 64. The control valve 72 is also responsive to the input control signal 68b. The signal 68b must be of a sufficient pressure so as to overcome the bias force 78 before the control valve 72 is moved into the transmitting position. As an example, the valve 58 may begin moving at low pressures and reach full movement at approximately 200 psi, whereas the control valve 72 will not move until at least 150 psi has been reached. In this manner, the valve 58 will be actuated before actuation of the valve 72.

In the neutral position shown in FIG. 2, it is seen that fluid from pump 66 is transmitted via conduit 88, valves 58 and 60 directly to the collecting tank 80. Assuming the operator imparts an input signal at 68a, the valve 58 would be urged in the downward direction as viewed in FIG. 2. In this position, valve 58 provides direct communication between the pump 66 and conduit 56, as well as communication between conduit 54 and collecting tank 80a. It may be noted that collecting tanks 80 and 80a may be one and the same but are shown herein in separate positions for ease of illustration. Fluid from the pump 66 is directed through conduit 56 to the head end of the cylinder 24, thereby urging rod 28 outwardly therefrom. The outward movement of the rod 28 will cause the bucket to be pivoted in a counterclockwise direction about pivot shaft 22, as seen in FIG. 1. Fluid displaced from the cylinder 24 is transmitted through conduit 54 and valve 58 to collecting tank 80a. Check valve 82 prevents any reverse flow of the fluid from conduit 56 back to the pump 66 and conduit 88. In this operating condition, it is seen that the bucket may be rotated in a counterclockwise direction without independent movement of the apron 42.

A second operating condition exists when the operator imparts a pilot signal 70a to the circuitry. In this operative condition, valve 60 is urged in the downward direction and valve 58 remains stationary in the neutral condition. Fluid from pump 66 is thus transmitted via conduit 88, valve 58, check valve 84, valve 60 and conduit 62 to the rod end of cylinder 44. This causes a retraction of the rod 46 into the cylinder 44, thereby exhausting fluid from the head end of cylinder 44. The exhausted fluid is transmitted via conduit 64 through valve 60 to collecting tank 80a. Retraction of the rod 46 will cause the apron to open due to the pivoting movement of the link extension 48 about the pivot shaft 52, as seen in phantom in FIG. 1. Check valve 84 prevents reverse flow of fluid from conduit 62 back to the pump 66 and conduit 88.

Simultaneous application of input pilot signals 68a and 70a results in an operating condition identical to that first described. In other words, valve 58 will be actuated and move in the downward direction so as to control the direction of flow of the fluid from the pump 66. Even though valve 60 is actuated, there is no fluid directed to either end of the cylinder 44 so no independent movement of the apron 42 occurs.

A third operating condition occurs when input signal 70b is imparted to the circuitry. In this condition, the valve 60 is urged upwardly as viewed in FIG. 2, thereby providing direct communication between pump 66 and conduit 64. Fluid from pump 66 is then directed via conduit 88, valve 58, valve 84, valve 60, and conduit 64 to the head end of cylinder 44. Fluid is exhausted from the rod end of cylinder 44 as the rod 46 is urged outwardly from the cylinder 44. The exhausted fluid is transmitted to collecting tank 80a via conduit 62 and valve 60. In this operating condition, it is seen that the apron 42 will be pivoted to the closed position about the pivot shaft 52 due to the extension of the rod 46.

The bucket may be moved to the dig position, i.e., rotated in the clockwise direction, by application of the input pilot signal 68b. Signal 68b urges valve 58 upwardly as viewed in FIG. 2, so as to provide direct communication between pump 66 and conduit 54. The fluid in conduit 54 is transmitted to the rod end of cylinder 24, causing the rod 28 to be retracted thereinto and expelling fluid from the head end of cylinder 24 into conduit 56. The retraction of the rod 28 will act through the wrist linkage 30, causing the bucket 20 to be rotated about the pivot shaft 22. The fluid in conduit 56 is transmitted to the collecting tank 80a through valve 58.

If the input signal 68b is sufficiently large to overcome the bias of spring 78, the valve 72 will be urged to the left. Movement of the valve 72 to the left will provide communication between conduits 56 and 64. However, since valve 60 has not been actuated, conduits 62 and 64 are blocked by the valve 60. Therefore, there will be no movement of the apron 42. Valve 86 will prevent any reverse flow of fluid from the conduit 64 to the conduit 56.

From the above, it can be seen that an operator may independently open and close the apron as well as independently rotate the bucket in the clockwise and counterclockwise direction. This independent control will permit the operator to completely cycle the bucket from dig to dump to dig. However, this type of independent operation is relatively slow. In order to increase the cycle speed, it is desirable to have simultaneous apron closing and bucket return, i.e., rotation in the clockwise direction. To accomplish this, input control signals 68b and 70b are simultaneously applied to the hydraulic circuitry.

In this operating condition, valves 58 and 60 are both urged in the upward direction as viewed in FIG. 2. Due to the interrupted series-type configuration of valves 58 and 60, valve 58 controls the primary flow of fluid from the pump 66. Thus, fluid is transmitted from pump 66 through valve 58 to conduit 54 and to the rod end of cylinder 24. As hereinabove described, this action causes a retraction of the rods 28, thereby rotating the bucket in a clockwise direction. A substantial amount of back pressure is developed in the conduit 56 as the fluid is metered through the valve 58 to the collecting tank 80a. A portion of the flow of the fluid from the head end of cylinder 24 is therefore diverted through valve 72, previously actuated by signal 68b, to the conduit 64. Check valve 84 prevents flow of the diverted fluid either to the pump 66 or the tank 80. Thus, the diverted fluid flow is directed to the head end of the apron cylinder 44. The diverted flow of the fluid will cause the rods 46 of the cylinder 44 to extend, thereby closing the apron 42 simultaneously with the clockwise rotation of the bucket. Fluid expelled from the rod end of the cylinder 44 is transmitted via conduit 62 and valve 60 to the tank 80a. The simultaneous return of the bucket cylinder to the dig position and closing of the apron substantially reduces the cycle time for the operator.

It is seen that the hydraulic circuitry hereinabove described permits independent operation of the bucket cylinder and apron cylinders to independently control the movement of the bucket and apron. The interconnection of the control valve in parallel between the head end of each of the respective cylinders permits a simultaneous returning of the bucket to the dig position and closing of the apron in order to reduce the cycle time from dump to dig. Accordingly, the objectives hereinbefore set forth have been accomplished.

While a present exemplary embodiment of this invention has been illustrated and described, it will be recognized that this invention may be otherwise variously embodied and practiced by those skilled in the art.

What is claimed is:

1. In a bottom dump front shovel machine having a bucket and apron and independent hydraulic cylinders respectively connected therewith to control the respective movement of the bucket and apron, the bucket cylinder being operatively connected in pivoting fashion with the bucket and the apron cylinder being operatively connected in pivoting fashion with the apron, a source of hydraulic fluid and a hydraulic circuit in communication with each respective cylinder, the improvement in the hydraulic circuit comprising:

first and second selector valves for respectively directing fluid flow selectively from the source to the bucket cylinder and the apron cylinder thereby causing respective movement of the bucket and apron, said selector valves being operatively positioned in response to first and second actuation means;

said first selector valve being operatively connected with each end of the bucket cylinder and providing communication between the source and the bucket cylinder to direct flow to one end of the bucket cylinder depending on the operative position of said first selector valve;

said second selector valve being operatively connected with each end of the apron cylinder and providing communication between the source and the apron cylinder to direct flow to one end of the apron cylinder depending on the operative position of said second selector valve; and a control valve having a conducting and a nonconducting flow position, said control valve being connected in parallel between respectively one ends of the bucket and apron cylinders, said control valve being responsive to the actuation means for movement of said first selector valve in one direction wherein, when said first and second selector valves and said control valve are actuated, a portion of the flow from the bucket cylinder circuit is diverted through said control valve to the apron cylinder circuit thereby permitting simultaneous bucket and apron movement.

2. The improved hydraulic circuit as set forth in claim 1 in which said selector valves are three-position interrupted series-type valves wherein the first actuated valve directs the primary flow from the source to the respective circuit, each of said selector valves having a first neutral position in which flow is passed through said respective valve without being directed to a hydraulic circuit, said selector valves having second and third operative positions for directing flow to the rod end or head end of the respective cylinder in the hydraulic circuit depending on the operative position of said selector valves.

3. The improved hydraulic circuit as set forth in claim 2 further comprising bias means for urging said control valve into a nonconducting flow position wherein said first selector valve actuation means must overcome the force of said bias means in order to move said control valve to the conducting position.

4. The improved hydraulic circuit as set forth in claim 3 in which said control valve is operatively connected between the head end of the bucket cylinder and first selector valve and the head end of the apron cylinder and second selector valve.

5. The improved hydraulic circuit as set forth in claim 4 further comprising a check valve operatively connected between said control valve and the apron cylinder circuit to prevent reverse flow from the apron cylinder circuit through said control valve when said control valve is in the flow conducting position.

6. In a hydraulic circuit for a bottom dump front shovel machine having a first selector valve for selectively directing fluid flow to at least one bucket cylinder and a second selector valve for selectively directing fluid flow to at least one apron cylinder, the first and second selector valves having first and second operational conditions and being responsive to pressure signals for movement to the operational conditions, the improvement comprising a valve means operatively connected in parallel between the head end of the bucket cylinder and first selector valve and the head end of the apron cylinder and second selector valve, said valve means being responsive to the same signal pressure for actuating the first selector valve to a first operational condition in order to direct a portion of the discharge flow from one end of the bucket cylinder to the apron cylinder for causing simultaneous apron closure and bucket repositioning.

7. A hydraulic circuit comprising:

a source of fluid;

a fluid collecting reservoir;

a first fluid circuit;

a second fluid circuit, said first and second circuits each being in communication with said source and said reservoir;

a first selector valve operatively connected in said first circuit, said valve having a first operational condition for directing flow from said source in a first direction in said first circuit and a second operational condition for directing flow in a second direction;

a second selector valve operatively connected in said second circuit, said second valve having a first operational condition for directing flow from said source in a first direction in said second circuit and a second operational condition for directing flow in a second direction;

said first and second selector valves each being responsive to first and second independent actuation means to be operatively positioned in said first and second operational condition;

a control valve operatively connected between said first and second circuit, said control valve being responsive to the one actuation means urging said first selector valve to one operational condition wherein said control valve directs a portion of the flow from said first circuit to said second circuit when each of said selector valves are in the one operational condition.

* * * * *